United States Patent [19]

Emerson et al.

[11] Patent Number: 4,641,050

[45] Date of Patent: Feb. 3, 1987

[54] ELECTRODYNAMIC SHAKERS

[75] Inventors: Andrew C. Emerson, Royston; Stephen A. Foster, Clophill, both of England

[73] Assignee: Ling Dynamic Systems Limited, Hertfordshire, England

[21] Appl. No.: 692,756

[22] Filed: Jan. 18, 1985

[30] Foreign Application Priority Data

Mar. 20, 1984 [GB] United Kingdom ............ 8407248

[51] Int. Cl.$^4$ .................. H02K 33/00; H02K 35/00
[52] U.S. Cl. ......................................... 310/27; 310/13
[58] Field of Search ............... 310/43, 45, 60 A, 64, 310/81, 195, 208, 13, 27; 366/108, 116, 127; 73/665; 336/62, 96, 205, 206

[56] References Cited

U.S. PATENT DOCUMENTS

| | | | |
|---|---|---|---|
| 2,789,237 | 4/1957 | Efromson | 310/27 |
| 2,894,367 | 7/1959 | Gingrich | 310/27 X |
| 3,194,992 | 7/1965 | Brown | 310/27 |
| 3,234,782 | 2/1966 | Grootenhuis | 310/27 X |
| 3,277,696 | 10/1966 | Gertel | 73/71.6 |
| 3,891,868 | 6/1975 | Joyce | 310/309 X |
| 4,117,381 | 9/1978 | Pereny | 310/27 X |

FOREIGN PATENT DOCUMENTS

| | | |
|---|---|---|
| 1143573 | 6/1969 | United Kingdom . |
| 1281348 | 12/1972 | United Kingdom . |
| 1316173 | 5/1973 | United Kingdom . |
| 1474439 | 5/1977 | United Kingdom . |
| 1481165 | 7/1977 | United Kingdom . |
| 1580920 | 12/1980 | United Kingdom . |

Primary Examiner—Patrick R. Salce
Assistant Examiner—Marc S. Hoff
Attorney, Agent, or Firm—Biebel, French & Nauman

[57] ABSTRACT

An armature structure for an electrodynamic shaker comprises an armature support and an armature coil assembly mounted on the support. The coil assembly includes a cladding, or alternatively a spine, of a carbon fiber material. Preferably the carbon fibers extend generally longitudinally of the armature, that is to say in its direction of motion.

4 Claims, 3 Drawing Figures

ELECTRODYNAMIC SHAKERS

The present invention relates to electrodynamic shakers, otherwise known as vibration generators, such as are commonly used for vibration testing purposes and more particularly to an improved construction for the armature of such shakers.

BACKGROUND OF THE INVENTION

In the design of armatures for electrodynamic shakers it is normal to seek to achieve the maximum possible thrust for a given size of machine. There are many parameters which limit the thrust available, such as temperature rise, magnetic field strength and the mechanical strength of the armature coil.

Present forms of armature coil are generally constructed by bonding together adjacent turns of one or more current carrying conductors. Such conductors may be hollow to allow the passage of water for cooling purposes. In order further to strengthen the assembly and sometimes to assist in the manufacturing process other materials may be added externally or between the layers of the coil. Typical materials used are stainless steel for cladding the coil, a bonding material such as an epoxy-resin for bonding the turns of the coil and glass fibre cloth for forming a central spine to the coil assembly.

In normal operation of a shaker, large stresses are created in the composite armature structure as described above, the majority of such stresses arising in the drive axis. Each component of the composite armature structure will support a share of this stress and the total load will be shared principally between two items, namely the bond between adjacent coil turns and the cladding or spine material. The ratio in which this stress is shared will depend on the precise dimensions as well as the properties of the materials involved.

For practical reasons the design of the armature is constrained to fixed dimensions for the coil thickness and must generally provide the maximum conductor cross-sectional area. In order to provide maximum strength, this leaves a choice of cladding or spine material and thickness and a choice of glue to make the bond. It must be borne in mind that merely increasing the thickness of the cladding material will be at the expense of conductor cross-sectional area and hence this solution is not ideal. With commercially available bonding materials the coil bond is normally the weakest link in the chain and hence the material for the cladding or spine must be as stiff, i.e. have as high modulus of elasticity, as possible. Materials such as glass cloth or stainless steel have been used for this purpose but neither of these combine both high modulus, low weight and high fatigue strength.

SUMMARY OF THE INVENTION

The present invention provides a means for substantially improving the mechanical strength of the armature without degrading any other parameters.

According to the present invention the cladding or spine of the armature comprises a carbon fibre material. A carbon fibre composite has all of the desirable properties of high modulus of elasticity, low weight and high fatigue strength and allows a designer to increase the effective strength of the armature by up to 30% by correct optimisation of thickness and construction.

An important further advantage of this technique is that it reduces the levels of distortion produced in the motion of the armature in normal operation.

BRIEF DESCRIPTION OF THE DRAWINGS

The invention will now be further described, by way of example, with reference to the accompanying drawings in which.

DESCRIPTION OF THE PREFERRED EMBODIMENTS

Figure 1:
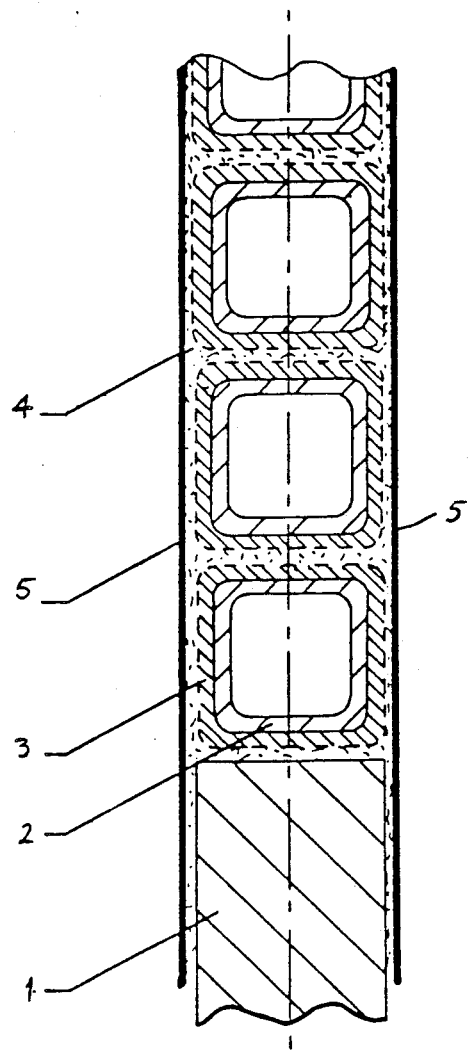
FIG. 1 is a cross-section through a part of one form of armature according to the invention.

Referring to FIG. 1, an armature frame 1 supports a hollow conductor 2 wound into the armature coil. The conductor is sheathed in glass fibre cloth 3 and the adjacent turns of the assembly are bonded together by and encapsulated in an epoxy resin 4. A cladding 5 formed of a composite of carbon fibres is provided on both inner and outer surfaces of the armature coil assembly.

Care must be taken with carbon fibres to avoid electrical currents circulating in the material due to electromagnetic induction and due to galvanic action. The latter of these produces a corrosion effect and will reduce the long term strength of the composite, whilst the former produces unwanted power losses.

The construction as described above avoids these problems and is found to produce increased strength in practice. Whilst this is shown for a water cooled armature having the hollow conductor 2, the invention may also be applied to other types of armature having solid conductors and also to armatures having a central spine for the coil assembly.

Figure 2:
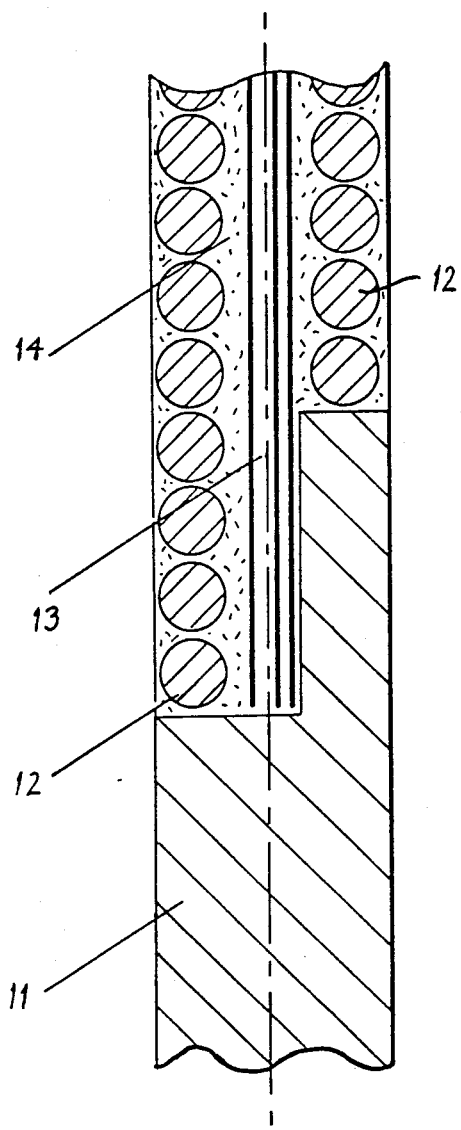
FIG. 2 is a cross-section through a part of another embodiment of armature.

One such armature is shown in FIG. 2 wherein an armature frame 11 supports solid conductors 12 wound into the armature coil and arranged on either side of a central spine 13 formed of a laminate of carbon fibres. The conductors 12 are bonded by and encapsulated in an epoxy resin 14.

Figure 3:
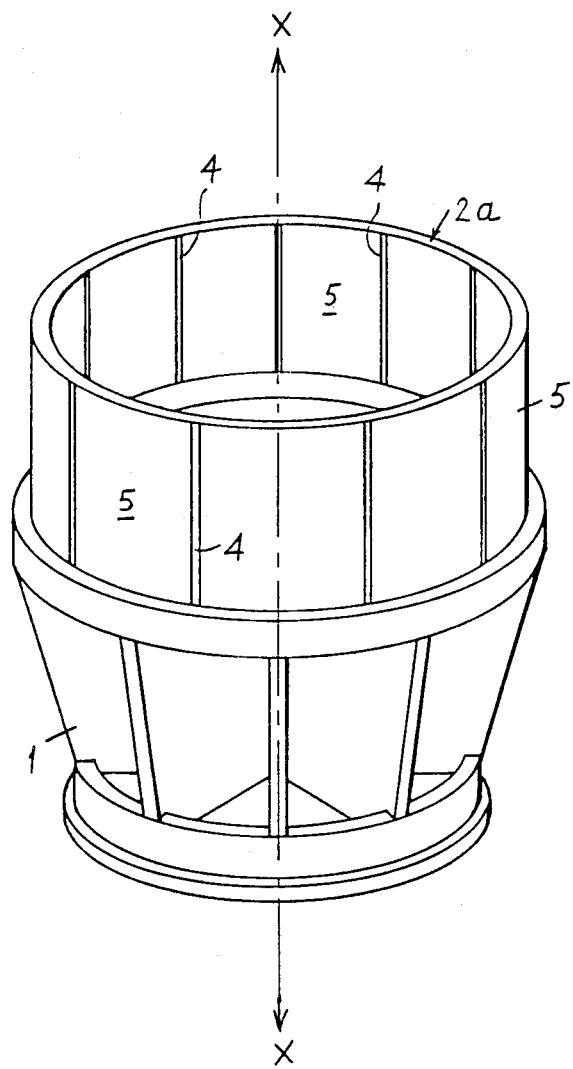
FIG. 3 is a perspective view of a complete armature assembly.

FIG. 3 is a perspective view of a complete armature embodying the construction of FIG. 1. As can be seen the armature coil, generally indicated at 2a is mounted on the armature frame 1 and the carbon fibre cladding 5 is in the form of panels. The gaps between adjacent panels is filled with the epoxy resin 4. The panels are fitted with the fibres extending generally longitudinally of the armature, that is to say with the fibres lying in the direction of motion of the armature, as indicated by the line X—X. Such an arrangement gives maximum strength in this direction and maximum stiffness.

The armature cladding is formed, from sheet material comprising a composite of carbon fibres pre-impregnated with uncured epoxy resin. The armature is then laid up with panels of the sheet material cut to the right shape and is finally vacuum impregnated with epoxy resin. The armature is then baked, which cures both the epoxy resin used to encapsulate the structure and the pre-impregnated carbon fibres themselves.

Clearly the armature may have other configurations besides that specifically shown in FIG. 3.

We claim:

1. An armature structure for an electrodynamic shaker comprising an armature support, an armature coil assembly comprising at least one conductor wound into the armature coil mounted on the support, and a cladding of carbon fibers of the armature coil assembly, said cladding having the carbon fibers disposed generally longitudinally of the armature coil assembly, that is to say, said fibers lie along the direction of motion of the armature.

2. An armature structure as claimed in claim 1, wherein the cladding of carbon fibres is provided on both the inner and outer surfaces of the armature coil assembly.

3. An armature structure as claimed in claim 1, wherein the cladding of carbon fibres is in the form of a series of segements or panels disposed over the surface of the armature coil assembly.

4. An armature structure as claimed in claim 1, wherein the at least one armature conductor is a hollow conductor sheathed in a glass fibre cloth, the adjacent turns of the coil are bonded together by an epoxy resin, and the carbon fibres are also pre-impregnated with an epoxy resin.

* * * * *